United States Patent [19]

Bitz

[11] Patent Number: 5,345,710
[45] Date of Patent: Sep. 13, 1994

[54] TRAP FOR SMALL ANIMALS

[76] Inventor: Ray Bitz, 5515 W. Erie, Ottawa Lake, Mich. 49267

[21] Appl. No.: 77,837

[22] Filed: Jun. 15, 1993

[51] Int. Cl.⁵ .......................................... A01M 23/16
[52] U.S. Cl. .................................................. 43/61
[58] Field of Search ................... 43/61, 60, 62, 67, 58

[56] References Cited

U.S. PATENT DOCUMENTS

| | | | |
|---|---|---|---|
| 583,924 | 6/1897 | McCoy | 43/61 |
| 1,421,298 | 7/1922 | Paetta | 43/61 |
| 1,654,434 | 12/1927 | Senecal | 43/61 |
| 1,759,048 | 5/1930 | Fisher | 43/61 |
| 1,892,423 | 12/1932 | D'Amato | 43/61 |
| 2,163,961 | 6/1939 | Pendry | 43/61 |
| 2,268,468 | 12/1941 | Adams | 43/61 |
| 2,447,147 | 8/1948 | Warner | 43/61 |
| 2,478,605 | 8/1949 | Symens | 43/61 |
| 2,524,504 | 10/1950 | Woolworth | 43/61 |
| 2,541,681 | 2/1951 | Andrews | 43/61 |
| 2,551,903 | 5/1951 | Roberts | 43/61 |
| 2,752,722 | 7/1956 | Gardner | 43/61 |
| 3,113,395 | 12/1963 | Van Kuren | 43/61 |
| 3,394,487 | 7/1968 | Wood et al. | 43/61 |
| 3,483,652 | 12/1969 | Hanlan | 43/61 |
| 4,080,749 | 3/1978 | Gilaugh | 43/61 |
| 4,162,588 | 7/1979 | Wyant | 43/61 |
| 4,310,984 | 1/1982 | Brubaker, Jr. | 43/61 |
| 4,546,568 | 10/1985 | Seyles | 43/61 |
| 4,583,317 | 4/1986 | Beard | 43/61 |
| 4,590,704 | 5/1986 | Volk | 43/61 |
| 4,682,440 | 7/1987 | Hunter | 43/61 |
| 4,682,441 | 7/1987 | Straver | 43/61 |
| 4,706,406 | 11/1987 | Mowatt et al. | 43/61 |
| 4,763,439 | 8/1988 | Smith | 43/61 |
| 5,199,210 | 4/1993 | Nastas | 43/61 |

*Primary Examiner*—P. Austin Bradley
*Assistant Examiner*—Chuck Y. Mah
*Attorney, Agent, or Firm*—David C. Purdue; John C. Purdue

[57] ABSTRACT

An animal trap is disclosed. The trap comprises a tubular housing which can be too small to accommodate movement of an adult hand inside. A trap door is mounted at one end of the housing for movement between a first position, set or open position and a second, closed position. The other end of the housing is closed. The trap further comprises a door latch, a bait stick and a bait stick holder. The trap is set by positioning the door latch so that it keeps the door in the first position until the bait stick is disturbed, whereupon the door latch is released and the door moves to the second, closed position. The bait stick is supported in a bait stick holder which, in turn, is positioned in an aperture in the housing and engages a portion of the housing wall. The trap is constructed so that the bait stick and the bait stick holder can be removed from the housing for baiting the bait stick outside the housing.

6 Claims, 2 Drawing Sheets

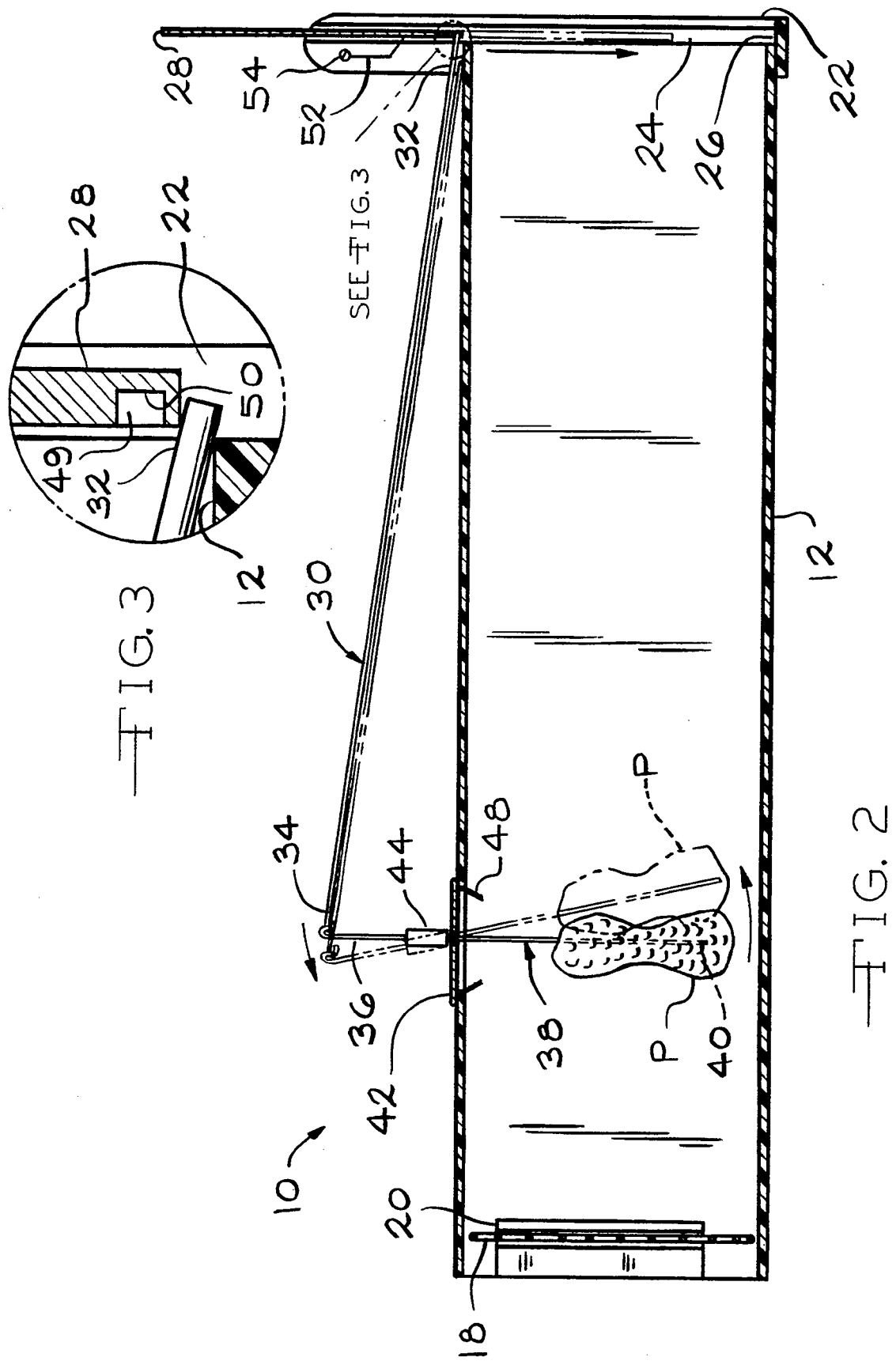

TRAP FOR SMALL ANIMALS

BACKGROUND OF THE INVENTION

1. Field of the Invention.

The present invention relates generally to traps for animals and especially small animals such as chipmunks and the like. More specifically, the invention relates to a live trap including a novel bait holding mechanism.

2. Description of the Prior Art

Live traps for animals are well known and generally comprise a trap housing and at least one door which, in a first, set position, allows an animal to enter the trap housing and, in a second, closed position, closes the housing to prevent an animal from leaving the housing. Many door closing mechanisms are disclosed in the prior art and they generally rely on gravity to move the door from the first position to the second position, although spring closure mechanisms are disclosed in U.S. Pat. Nos. 1,892,423 and 2,524,504.

In addition to the patents listed above, during a search of the prior art, the following U.S. Pat. Nos. were noted: 1,421,298; 1,654,434; 2,268,468; 2,447,147; 2,478,605; 2,541,681; 2,551,903; 2,752,722; 3,113,395; 3,394,487; 3,483,652; 4,080,749; 4,162,588; 4,310,984; 4,546,568; 4,583,317; 4,590,704; 4,682,440; 4,682,441; and 4,706,406.

U.S. Pat. No. 4,310,984 (Brubaker, Jr.) discloses a rodent trap with a bait hook which is suspended within the housing of the trap, near a rear end closure of the trap. Baiting of the bait hook is carried out by opening the rear end closure and baiting the bait hook while it is inside the trap housing.

Generally, trap housings are sized to accommodate the size of the animal to be trapped. In the case of traps designed for chipmunks, mice and other small critters, the trap housings are usually oversized in order to permit baiting of the trap because a trap housing sized for a chipmunk would be too small to accommodate an adult hand. In traps where bait is to be suspended on a bait stick positioned inside the trap housing, baiting is, nonetheless, difficult. The trap disclosed in Brubaker, Jr. has a trap door at one end of the trap housing and a rear end closure at the other end of the trap housing. The rear end closure is removable so that baiting of the bait hook, which remains inside the housing, is facilitated.

SUMMARY OF THE INVENTION

The present invention is an animal trap comprising a tubular housing which is closed at one end, a door mounted at the other end of the housing, a door latch, a bait stick and a bait stick holder. The door is movable between a first, set position and a second, closed position. When the trap is set, the door latch keeps the door in the first position until the bait stick is disturbed, whereupon the door latch is released and the door moves to the second, closed position. The bait stick is supported in a bait stick holder which, in turn, is positioned over an aperture in the housing and engages a portion of the housing wall. In order to bait the bait stick, the bait stick and the bait stick holder are removed from the housing, the bait stick is baited outside the housing and the bait stick holder is replaced in the aperture in the housing. This construction permits the use of a small trap housing, even one too small to accommodate the hand of an adult.

It is therefore a primary object of the present invention to provide a trap which is easily baited.

Another object of the invention is to provide a trap with a unitary tubular housing having a bait stick opening in it.

Another object of the invention is to provide a live trap with a bait stick which can be baited outside the trap.

It is a further object of the present invention to provide a live trap which is especially suited for chipmunks and other small animals.

These and other objects and advantages of the present invention will no doubt become apparent to those skilled in the art after they have read the following detailed description of the preferred embodiment which is illustrated by the various drawing figures.

BRIEF DESCRIPTION OF THE DRAWINGS

FIG. 2 is a cross sectional view, taken along the line 2—2 of FIG. 1, showing the workings of a trap according to the invention.

FIG. 3 is an enlarged, cross sectional view of the indicated portion of FIG. 2.

DETAILED DESCRIPTION OF THE PREFERRED EMBODIMENT

Figure 1:
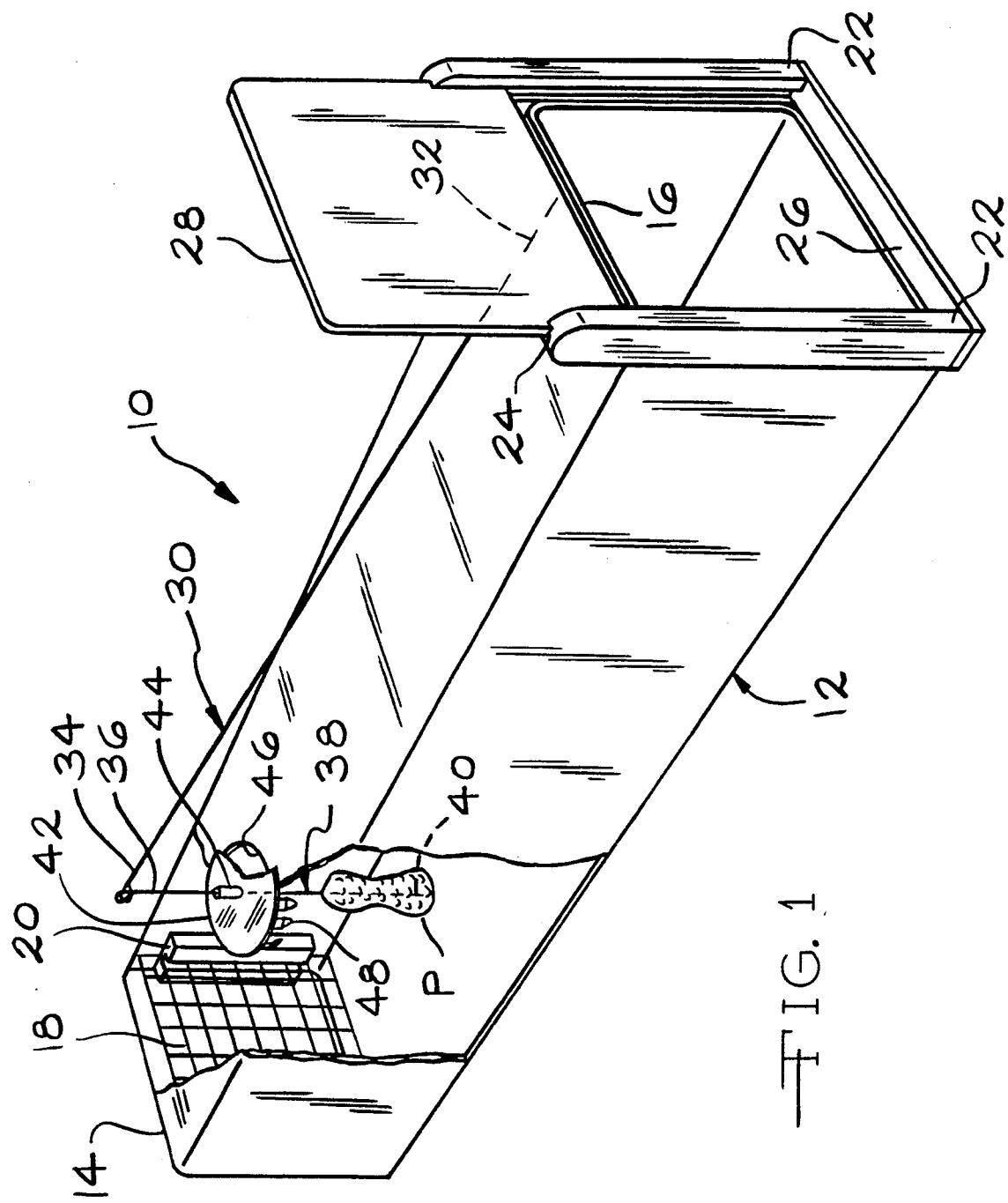
FIG. 1 is perspective view, partially broken away, showing a trap according to the present invention.

Referring now to FIG. 1, a live animal trap according to the present invention is indicated generally at 10. The trap 10 comprises a tubular housing 12 which has a first end 14 and a second end 16. The first end 14 is closed, in the illustrated embodiment, by a wire mesh 18 which is supported on the housing 12 by a pair of opposed support brackets 20 (only one of which can be seen in FIGS. 1 and 2). The support brackets 20 are glued or otherwise secured to the inside surface of the housing 12. It will be readily appreciated that other means may be employed for closing the first end 14 of the housing 12, including a solid panel glued or otherwise secured to the housing 12.

It is preferred that the housing 12 be formed of plastic/polymeric material with solid wall(s). Alternatively, the housing may be formed of metal or other materials. The housing 12 should form an enclosed passageway which is sized large enough at least to accommodate the animal to be trapped.

A pair of trap door guides 22 are supported on the second end of the housing 12. The guides include channels, indicated at 24, which are closed at their lower ends, by a base 26. A trap door 28 is slidably mounted in the channels 24 for movement between a first, set or open position which is illustrated in FIGS. 1 and 2, and a second, closed position which is not illustrated. In the closed position, the trap door 28 effectively closes the second end 16 of the housing 12. A trap door latch 30 has a first end 32 which can be positioned, as described below in more detail, between the trap door 28 and the second end 16 of the housing 12 to maintain the door 28 in the first, set position. A second end 34 of the latch 30 is connected to a second end 36 of a bait stick 38. A first end 40 of the bait stick 38 is suspended inside the housing 12 with a peanut P supported on it.

Referring now to FIG. 2, it is seen that the latch 30 is movable between a first position, shown in solid lines, where it supports the door 28 in the first, set position, and a second position, shown in phantom lines, where the latch 30 does not support the door 28, leaving it free to fall within the channels 24, towards the second, closed position in which it closes the second end 16 of the housing 12.

As explained below, movement of the latch 30 between the first position and the second position is effected when the peanut P is moved from the position shown in solid lines in FIG. 2 to the position shown for it in phantom lines. The bait stick 38 is pivotally supported relative to a bait stick holder 42 which comprises a cap with a hole (not shown) in the center of the holder 42, through which the bait stick 38 extends. A collar 44 is secured to the bait stick 38 and supports it in the bait stick holder 42 so that the first end 40 of the bait stick 38 is suspended inside the housing 12. The bait stick holder 42, in turn, is supported on the housing 12 in an aperture defined by an edge 46. Flanges 48 depend from the bait stick holder 42 and engage the edge 46 of the aperture in the housing 12, thereby supporting the bait stick holder 42, relative to the housing 12. The flanges 48 are flexible so that the bait stick holder 42 can be removed and replaced in the aperture in the housing 12, defined by the edge 46.

In the illustrated embodiment, the second end 36 of the bait stick 38 terminates in a closed loop and the end 34 of the trap door latch 30 also terminates in a closed loop. The end 36 of the bait stick 38 is flexibly connected to the end 34 of the trap door latch 30, through engagement of their respective closed loops. It will be appreciated that similar results could be obtained if the bait stick 38 and the trap door latch 30 were unitary, or rigidly connected. The flexible connection is preferred because, among other things, it facilitates placement of the trap door latch 30 between the door 28 and the housing 12.

Operation of the trap 10, as described thus far, would involve: removing the bait stick 38 and the bait stick holder 42 from the housing 12; inserting the bait stick 38 through the hole in the bait stick holder 42; impaling a peanut or other bait with the end 40 of the bait stick 38 (or otherwise securing a bait to the bait stick 38); replacing the bait stick holder 42 in the housing aperture defined by the edge 46; and inserting the end 32 of the trap door latch 30 between the housing 12 and the trap door 28, so that the latch 30 supports the door 28 in the first, set position. When an animal such as a chipmunk (not shown) enters the trap 10, it will observe the peanut or other bait and attempt to pull the bait out of the trap 10, thereby moving the latch 30 to a position where it is inoperable to support the door 28 in the first, set position. Unsupported, the door 28 will fall, guided by the channels 24 in the door guides 22, to a position (not illustrated) where the door closes the end 16 of the housing 12, thereby entrapping the animal within the trap 10.

Referring now to FIG. 3, a recess 49 in the lower end of the door 28 is illustrated. The recess does not extend through the door 28 but has a bottom 50. The end 32 of the latch 30 can be received in the door recess and the bottom 50 of the recess prevents the latch 30 from extending through the door 28. When the latch 30 is received in the recess, this construction minimizes the degree of movement required in the latch 30 to release the door 28 to move from the first, set position to the second, closed position. This affords a relatively foolproof way to set the trap 10. It will be appreciated, however, that the latch 30 will perform its function very well if it is positioned under the door 28, as shown in FIG. 3, instead of in the recess 49.

Referring again to FIG. 2, a mechanism for locking the door 28 in the second, closed position is illustrated. The mechanism comprises a spring clip 52 which is secured to one of the support brackets 20, by a screw 54. The spring clip 52 is biased toward the door 28 which, in the first position, prevents the spring clip 52 from entering the plane defined by the channels 24 in the support brackets 20. When the door 28 moves to the second position, however, it no longer prevents the spring clip 52 from entering the plane defined by the channels 24. With the door 28 in the second position, the bias of the spring clip 52 causes a portion of it to enter the plane defined by the channels 24, where it prevents the door 28 from returning to the first position, until the spring clip is moved back to the position illustrated for it in FIG. 2. Thus, there is provided a latch means which blocks the door 28 from moving from the second, closed position, to the first, open position. This will serve to prevent children from accidently or otherwise releasing an animal which has been trapped in the trap 10.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An animal trap comprising a hollow, tubular housing having first and second ends and an opening for a bait stick holder in the housing intermediate said first and second ends, closure means mounted on said housing for closing said first end of said housing, trap door means mounted on said second end of said housing for movement between a first position in which it is inoperable, and a second position in which it is operable, to close said second end of said housing.

trap door latch means movable between a first position in which it is operable, and a second position in which it is inoperable, to maintain said trap door means in said first position, a bait stick having a first end on which a bait can be supported, a removable bait stick holder having means for releasably engaging said housing adjacent the bait stick holder opening and supporting said bait stick holder on said housing, said bait stick holder having an aperture through which the bait stick can extend, support means for pivotally supporting said bait stick within the bait stick holder aperture so that said first end of said bait stick is suspended within said housing, and means for translating movement of said first end of said bait stick into movement of said trap door latch means between said first and second positions, wherein, said bait stick and said bait stick holder can be removed from said housing, bait can be applied to said first end of said bait stick outside of said housing and wherein said first end of said bait stick with bait thereon can be reinserted through the opening in said housing and supported therein by said bait stick holder.

2. The animal trap claimed in claim 1 wherein said housing has a cross-sectional area which is too small to accommodate an adult hand.

3. The animal trap claimed in claim 1 and further comprising a spring clip which is connected to said trap and is movable between a first position where it is operable and a second position where it is inoperable to prevent said trap door from moving from said second position to said first position, and wherein said spring clip is biased towards said first position.

4. An animal trap comprising
- a hollow, tubular housing having first and second ends and a bait stick opening in the housing intermediate said first and second ends,
- closure means mounted on said housing for closing said first end of said housing,
- trap door means mounted on said second end of said housing for sliding movement between a first position in which it is inoperable, and a second position in which it is operable, to close said second end of said housing,
- trap door latch means movable between a first position in which it is operable, and a second position in which it is inoperable, to maintain said trap door means in said first position,
- a bait stick having a first end on which a bait can be supported,
- a removable bait stick holder having flanges for releasably engaging said housing adjacent the bait stick opening and supporting said bait stick holder on said housing, said bait stick holder having an aperture through which the bait stick can extend,
- a collar pivotally supporting said bait stick within the bait stick holder aperture so that said first end of said bait stick is suspended within said housing, and
- said bait stick and said latch being connected so that movement of said first end of said bait stick is translated into movement of said trap door latch means between said first and second positions,
- wherein, said bait stick and said bait stick holder can be removed from said housing, bait can be applied to said first end of said bait stick outside of said housing and wherein said first end of said bait stick with bait thereon can be reinserted through the opening in said housing and supported therein by said bait stick holder.

5. The animal trap claimed in claim 4 wherein said housing has a cross-sectional area which is too small to accommodate an adult hand.

6. The animal trap claimed in claim 4 and further comprising a spring clip which is connected to said trap and is movable between a first position where it is operable and a second position where it is inoperable to prevent said trap door from moving from said second position to said first position, and wherein said spring clip is biased towards said first position.

* * * * *